US009826042B2

(12) United States Patent
Lotlikar et al.

(10) Patent No.: US 9,826,042 B2
(45) Date of Patent: Nov. 21, 2017

(54) POLICIES FOR SESSION TYPES

(75) Inventors: Mahesh Lotlikar, Sammamish, WA (US); Sriram Sampath, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1143 days.

(21) Appl. No.: 12/045,678

(22) Filed: Mar. 10, 2008

(65) Prior Publication Data

US 2009/0228594 A1    Sep. 10, 2009

(51) Int. Cl.
*H04L 29/08* (2006.01)

(52) U.S. Cl.
CPC ........... *H04L 67/14* (2013.01); *H04L 67/146* (2013.01); *H04L 67/147* (2013.01); *H04L 67/148* (2013.01)

(58) Field of Classification Search
CPC ...................................................... H04L 67/14
USPC ........................................ 709/208, 227, 228
See application file for complete search history.

(56) References Cited

U.S. PATENT DOCUMENTS

| 6,098,093 | A | 8/2000 | Bayeh et al. | |
|---|---|---|---|---|
| 6,286,034 | B1 | 9/2001 | Sato et al. | |
| 6,931,446 | B1* | 8/2005 | Cox et al. | 709/227 |
| 7,864,693 | B2* | 1/2011 | Burman et al. | 370/252 |
| 2003/0084167 | A1 | 5/2003 | Dweck | |
| 2005/0233727 | A1 | 10/2005 | Poikselka et al. | |
| 2006/0195586 | A1 | 8/2006 | Stoyanov et al. | |
| 2006/0248180 | A1 | 11/2006 | Bernardi et al. | |
| 2007/0002834 | A1 | 1/2007 | Taylor | |
| 2007/0005693 | A1 | 1/2007 | Sampath et al. | |
| 2007/0047699 | A1 | 3/2007 | Yuhanna et al. | |
| 2007/0106727 | A1 | 5/2007 | Mainard | |
| 2007/0192827 | A1 | 8/2007 | Maxted et al. | |

OTHER PUBLICATIONS

"Pluggable Session Management for Java Servlet Based Web Applications", SYS-CON Media, Inc., 2004, pp. 1-8.
Dezani-Ciancaglini, et al., "Session Types for Object-Oriented Languages", ECOOP 2006, vol. 4067, Springer-Verlag Berlin Heidelberg, 2006, pp. 328-352.
Gay, et al., "Asynchronous Functional Session Types", May 30, 2007, pp. 19.
"International Search Report", dated Mar. 6, 2009, Application No. PCT/US2009/036407, p. 1-11.

* cited by examiner

*Primary Examiner* — Adnan Mirza
(74) *Attorney, Agent, or Firm* — Davin Chin; Chin IP, PLLC (57) ABSTRACT

A session-specific policy may be used to define specific configuration and operational characteristics of different types of sessions. One type of session may have one set of characteristics while a second type of session may have a different set of characteristics. The policy may be applied by a server or client, and may be propagated through an enterprise by a policy distribution management system to establish policies across multiple devices. Different session types include sessions from a local console, a remote user, a device-initiated session, a service-initiated session, and other types. Within each session type, policies may be defined for specific instances of each type. For example, different policies may be defined for different devices in a device-initiated policy.

24 Claims, 3 Drawing Sheets

POLICIES FOR SESSION TYPES

BACKGROUND

Various mechanisms may be used to communicate between different devices. In many deployments, a connection between a device or user and another device may be operated as a session. Each session may be separated from other sessions using various mechanisms and operated independently. For example, a server device may host sessions from different users. Each user may experience a separate connection with the server, and in many cases, the users may not know that another user has a session or what the user is doing.

SUMMARY

A session-specific policy may be used to define specific configuration and operational characteristics of different types of sessions. One type of session may have one set of characteristics while a second type of session may have a different set of characteristics. The policy may be applied by a server or client, and may be propagated through an enterprise by a policy distribution management system to establish policies across multiple devices. Different session types include sessions from a local console, a remote user, a device-initiated session, a service-initiated session, and other types. Within each session type, policies may be defined for specific instances of each type. For example, different policies may be defined for different devices in a device-initiated policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A policy may be used to define various characteristics of a session with a device, and specifically, characteristics for various types of session. Various session types may be include communication between a device and a server, client, remote user, local user, remote service, or other types. For each session type, different operational and configuration characteristics of the session may be defined.

In many computing and network architectures, a computing device such as a server may establish one or more sessions, with each session being a communication session with a different object. An object may be a user, application, device, service, or other entity that may establish a communication session. The sessions may be configured and operated based on the type of session as defined in a policy.

A policy may define various configuration characteristics for different types of sessions, which may include the resources that may be allocated to the session, any redirection or forwarding of various resources, the user interface configuration, communication parameters, and other configuration characteristics.

Some policies may define operational characteristics of a session type. Such characteristics may include idle time policies, logoff policies, and other such characteristics.

In many embodiments, a metapolicy may be established for a device. A metapolicy may define parameters that affect multiple sessions or parameters that define the effects of multiple sessions. Examples may include parameters about the total number of sessions, the number of specific session types, and other parameters.

The session policies may be distributed using various mechanisms and applied to both or either client devices or servers. A client policy may define characteristics of a session that may be established by the client. A server policy may define characteristics of a session that may be established by another device or user. In some situations, a device may take on a server or client role. For example, a personal computer may act as a client when establishing a remote desktop session with a server, but may act as a server when a media player device establishes a session through a Universal Serial Bus (USB) connection.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
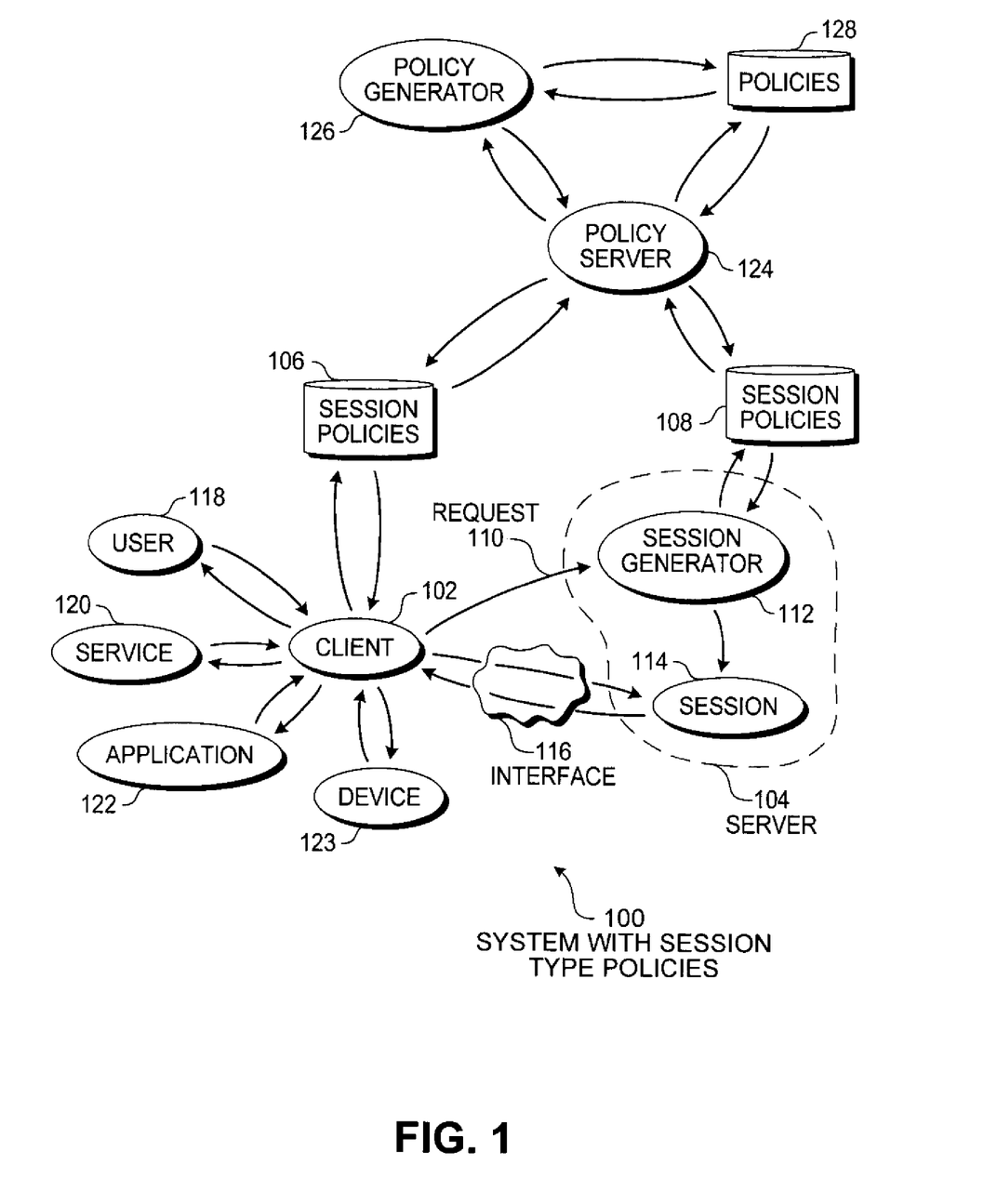
FIG. 1 is a diagram illustration of an embodiment showing a system with session type policies.

FIG. 1 is a diagram of an embodiment 100 showing a system with session type policies. Embodiment 100 is a simplified example of a client/server configuration where a session may be configured using policies defined for the specific type of session. The policies may be applied by either or both of the client and server, and may be distributed by a policy server.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of the components that may make up a system that uses session specific policies. Such policies may define various characteristics of sessions between two devices, and the policies may be defined differently for different types of sessions. A session may be created when a user connects to a server device using a client device and may display a desktop graphical user interface from the server on the client. Such a remote desktop session may have one set of policies, while another type of session may have a different set of policies.

Throughout this specification and claims, the terms 'client' and 'server' may be used to describe a client device that accesses a service on another computer, which is the server. A session may describe the interaction between the client and server. In many cases, a single device may act in either a client or server role. For example, a personal computer may connect through a network to a server device to access an application provided by the server. The same personal computer may connect to a portable media player and act as a server while the media player may act as a client. In some cases, the client and server may each provide services to the other, which may blur the distinction between the terms.

For the purposes of this specification and claims, the client device may be considered the device that may initiate a session with a server, regardless of the services provided across a session.

Sessions may be lasting connections between two devices. In a typical session, many packets of information may be transmitted back and forth between the two devices, and the session may persist even when information is not flowing. In some embodiments, a session may be established using the session layer of a network protocol.

In other embodiments where transport protocols do not implement a formal session layer, sessions may be maintained by a higher level program using various methods defined in the data that is exchanged. For example, an HTTP exchange between a browser and a remote host may include an HTTP cookie which may identify state, such as session identification.

There may be many different types of sessions. In each embodiment, sessions may be generalized or categorized so that policies may be applied to groups of sessions using different levels of specificity, depending on the embodiment. Several examples of session types may include local and remote terminal sessions, sessions for accessing specific services or applications, and sessions created to connect specific types of devices.

Many operating systems may establish sessions with each user of the operating system. A local user on a system may have a local terminal session that may enable the user to input using input devices attached to the system and receive output on output devices attached to the system. Such a local terminal session may be created for a typical user of a personal computer.

A remote terminal session or remote desktop session may be created when a client is connected over a network or other connection to another device, which acts as a server. Some operating systems may enable a client device to use the input and output devices on the client device to interact with a desktop view of the server device. When such a session is in place, a user on the client device may interact with the server device using a graphical user interface provided from the server.

Some sessions may be created for accessing specific types of data and may be created using specific applications or services. For example, a media sharing program may connect to a server device to access video, audio, or other media from the server. Some media sharing programs may be capable of, for example, displaying or presenting the media on a client device.

Other sessions may be established for operating a business line application. In some cases, multiuser applications may be configured in a client-server architecture where the client device may operate a client application which may interact with a server application operated on a server device. Various embodiments may use a 'thick client' where a bulk of data processing and storage may be performed on the client device, a 'thin client' where a bulk of data processing and storage may be performed on the server device, or various hybrid architectures.

Some sessions may be created for connecting specific types of devices. For example, a portable media player may create a session for uploading, downloading, and playing various media such as audio, video, and still images. In another example, a mobile telephone may create a session for synchronizing data with a user's calendar, address book, or for other uses. In still another example, a remote video camera may create a session for providing surveillance video and receiving control commands.

Each session type may have different characteristics. Some of the characteristics may be defined by an optimum performance configuration for the specific type of session, or by load balancing, network traffic reduction, or other considerations.

Some embodiments may define policies for broad session types. For example, policies may be defined for a local terminal sessions, remote terminal sessions, media related sessions, and general sessions. Other embodiments may have more granular or specific session types. For example, policies may be defined separately for terminal sessions from one group of users than for terminal sessions from a different group of users. Some policies may be defined differently for access to different services provided by a server. Some policies may be a 'lockdown' policy that may restrict a certain type of session for a specific type of device or service.

In some embodiments, metapolicies may be defined that are used with a policy definition to control or effect sessions on a meta-level. For example, a metapolicy may define the total number of sessions that may be hosted by a server, or define a formula for determining if a session may be hosted. Other examples of metapolicies are described later in this specification.

The interaction between a client 102 and server 104 in embodiment 100 may be governed at least in part by session policies 106 and 108. The session policies 106 and 108 may describe various characteristics of sessions based on the type of session. One set of characteristics may be defined for one type of session, and a second set of characteristics may be defined for a second type of session.

Various examples of the type of characteristics that may be defined in a policy for session types are given later in this specification.

The session policies 106 may be used by the client 102 in setting up and operating a session with the server 104. Similarly, the session policies 108 may be used by the server 104 in establishing and operating a session with the client 102.

In some embodiments, session policies may be provided at either or both of the client 102 and server 104. In some cases, a session may be established using only policies on the client 102. In other cases, a session may be established using only policies on the server 104. In still other cases, a session may be established using policies on both the client 102 and server 104.

In order to establish a session, the client 102 may generate and send a request 110 using the session policies 106 to a session generator 112 at the server 104. The session generator 112, using the session policies 108, may establish the session 114 that may communicate through the interface 116 with the client 102.

The session policies 106 may be used by the client 102 to define what types of sessions are permitted and what characteristics such sessions may have. The characteristics may be in the form of a set of parameters that are incorporated in the request 110 sent to the server 104. In some cases, the session policies 106 may permit, deny, or restrict a client's ability to request a session. Some embodiments may use the session policies 106 to configure how the client 102 responds to interactions with the session 114.

Similarly, the session policies 108 may be used by the server 104 to determine if a session may be created in response to the request 110. Once a determination is made that a session may be created, the policies 108 may be used to configure and operate the session 114.

The request 110 may be generated in response to input from a user 118, a service 120, an application 122, or a device 123. A user 118 may cause a request 110 to be generated by requesting a remote desktop session, by initiating a request from a command line, or from some other action. In many cases, a user 118 may launch a service 120 or application 122 that may be configured to connect to the server 104 and establish a session. In some cases, a device 123 attached to the client 102 may establish a session with the server 104.

The interface 116 through which a session operates may be any type of connection between the client 102 and server 104. In many cases, the interface 116 may be an Ethernet network interface, but the interface 116 may be any type of communications mechanism. In some embodiments, the interface 116 may be a direct local connection between devices, such as a serial interface, Universal Serial Bus (USB) connection, FireWire, or other local connection. Some embodiments may be wired or wireless connections, and may use any type of protocol or mechanism to communicate.

In many embodiments, the request 110 may be transmitted through the interface 116. In some embodiments, the request 110 may be transmitted through a different connection or interface than the interface 116.

The session policies 106 and 108 may be created and distributed by a policy server 124. The policy server 124 may be an administrative server or other device that may generate and distribute policies across a group of devices. In an example of a company or other large enterprise, a central server may be used to distribute and manage policies across many different client and server devices within the enterprise. In some such deployments, separate policies may be defined for various departments within an organization, groups of users, device types, or other groups within the organization.

Such policies may be generated by a policy generator 126 and stored in a policy database 128. The policy generator 126 may be an administrative user interface through which an administrator may create policies and assign the policies for distribution. The policy database 128 may store policies for various devices across an organization, and may have various templates or standardized policies that may be modified to suit various conditions.

The policy server 124 may distribute policies 106 and 108 to the client 102 and server 104, respectively. In some embodiments, the policy server 124 may push the policies to the recipient devices when policies are initially distributed or when updates are made. In some embodiments, the client 102 and server 104 may pull the policies from the policy server 124 by periodically polling the policy server 124 to see if a new or updated policy is available, then initiating a download sequence to receive the policies.

When policies are downloaded or otherwise transmitted to the client 102 and server 104, the respective policies 106 and 108 may be stored locally. For example, the session policies 106 may be stored on a locally accessible storage mechanism to the client 102, such as a hard disk. The locally stored policies may be referenced whenever a session is to be initiated or during the operation of a session.

In some embodiments, the policies 106 and 108 may not be stored locally but may be accessed over a network by making requests to the policy server 124 at each instance a policy may be used. In a typical use of such an embodiment, a server 104 may receive a request 110 from a client 102.

The server 104 may send a policy request to the policy server 124 and receive the session policies 108. The server 104 may then establish the session 114 using the session policies 108. Such an embodiment may be useful when policies may change frequently.

Figure 2:
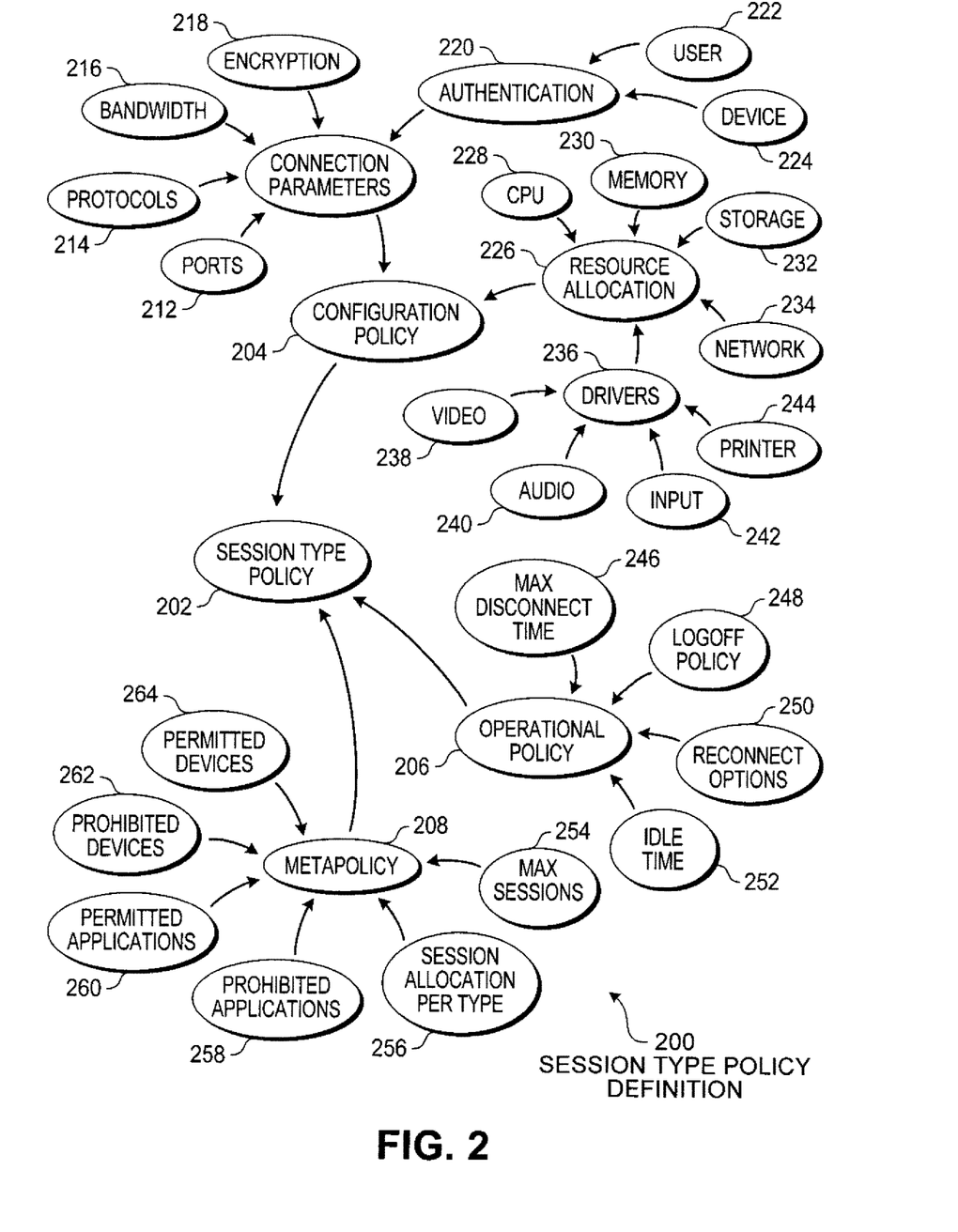
FIG. 2 is a diagram illustration of an embodiment showing a session type policy definition.

FIG. 2 is a diagram illustration of an embodiment 200 showing the contents of a policy for a specific session type. Embodiment 200 is a graphical example of different components that may make up a policy for a specific type of session.

Embodiment 200 is merely one example of various parameters, settings, and other components that may be defined within a policy. The example of embodiment 200 is intended to be merely exemplary: other embodiments may include many more elements for a policy and may include several elements in much more detail than in embodiment 200. Some policies may generalize many of the elements of embodiment 200 into a single setting or configuration parameter as well.

In many embodiments, a general policy may define a default policy for a session, and session specific policies may modify the general policy for a specific session type. For example, a general policy may define many tens or hundreds of parameters that may be applied to sessions in general. A session specific policy may include a single variable or setting that overrides the general policy for a specific type of session.

The policy may be defined in any manner. In many cases, a policy may be stored and transmitted to a client or server using a text or human readable format. For example, XML may be used to describe the elements within a policy and transmit the policy to a client or server. In many embodiments, the policy may be analyzed by the client or server and added to a registry, converted to a different format, or otherwise be implemented on the receiving device.

The session type policy 202 may be made up of configuration policy 204, operational policy 206, and metapolicy 208. The distinction between configuration policy, operational policy, and metapolicy is used in this example to help classify and organize the different elements of a session type policy, but is not meant to be limiting in any manner. Other embodiments may group policy components in different manners, organize the components in different fashions, and use different nomenclature and terminology for similar concepts. Many embodiments may have additional or fewer elements that may be defined for a session than in embodiment 200.

For each parameter or option discussed, a different value may be defined for a different session type. Each embodiment may have a different grouping and definition for a session type. In some embodiments, a session type may be a very broad category, such as a session with an application. Other embodiments may be more specific, identifying a separate session type for an application that streams media. Still other embodiments may have one set of settings for applications that stream video media and a second set of settings for applications that stream audio media.

Configuration policy 204 may relate to parameters and options that may affect the setup of a session. Various connection parameters 210 may be defined that relate to the network or communication parameters that may be configured for a session. In some cases, such settings may match settings used by a specific application. In other cases, the settings may be defined to coordinate with network routing devices.

The connection parameters 210 may include defining the ports 212 used by a client and server for communicating. In some embodiments, firewalls and other network devices may permit or deny communications across various ports. By selecting the proper port, communication may be established.

Many network and device to device communications use various protocols 214 that may be defined for a specific session type. Protocols may be conventions or standards that control or enable the connection, communication, and data transfer between a client and server. In its simplest form, a protocol can be defined as the rules governing the syntax, semantics, and synchronization of communication. Protocols may be implemented by hardware, software, or a combination of the two. At the lowest level, a protocol may define the behavior of a hardware connection.

Protocols may be used to define handshaking, negotiation of various connection characteristics, starting and stopping messages, how to handle corrupted or improperly formatted messages, how to handle unexpected loss of connection, termination of a session, and other functional elements.

Bandwidth 216 may be defined for a session type. In some session types, a minimum amount of communication bandwidth may be used to ensure the session performs as desired. In some cases, if a certain amount of network or communication bandwidth is not available, a session may not be started. For example, a session type that may use real time or near-real time communications may use a high amount of available bandwidth. Other session types may operate acceptably with slower bandwidths.

An example of a high bandwidth session may be a session where media is streamed. An example may be where video media is streamed from a server to be displayed on a client. Another example may be a session for the connection of a telephony device. In such examples, low bandwidth may lead to an unacceptable level of performance.

Some sessions may use various sorts of encryption 218 in a session. The encryption parameter may define a certain level of security desired or may specify the type of encryption or security components that may be used with a session. An example may be a session between a client and server where the connection occurs over the Internet and sensitive information may be transmitted and received. The encryption 218 setting may define a public key/private key, secure sockets layer (SSL), or some other encryption and security scheme that may be used for that specific session type. In many cases, other session types may not use a security component for various reasons.

Many sessions may use various forms of authentication 220. In some cases, a user authentication 222 may cause a user-specific authentication to be used. A user authentication may be a login identification and password, a secure access card, a biometric scan, or some other mechanism by which a user may be authenticated. In some cases, a device based authentication 224 may be used. A device may be authenticated by providing a media access control (MAC) address, using a private key to encrypt a message, or many other methods.

Another part of configuration policy 204 may be various resource allocations 226 that may be defined for a specific type of session. The resource allocations 226 may refer to resources on the server or resources on the client that are allocated to the session.

Many different types of sessions may have different resource uses. One type of session may have a high demand for certain resources, such as CPU resources 228, memory resources 230, storage resources 232, and network resources 234. In some sessions, specific amounts of resources may be provisioned, allocated, or otherwise assigned to a session.

Some session types may use different configurations and settings for various drivers 236. In some cases, the drivers on a server may be redirected to the client, and in other cases, drivers on the client may be redirected to the server. The drivers may include video drivers 238, audio drivers 240, input device drivers 242, printer drivers 244, and others.

Operational policies 206 may define how the policy may behave during operation. Such settings may be different for each type of settings. Examples of operational settings may include a maximum disconnect time 246. The maximum disconnect time 246 may define when a session may be terminated after a client and server have been disconnected. In many cases, a session may persist when the client and server devices are disconnected or appear to be disconnected. After the maximum disconnect time 246 is exceeded, the session may be considered terminated.

Other operational policies 206 may include a logoff policy 248 that may be define how a session may be logged off and when a log off procedure may occur. Various reconnect options 250 may define how a reconnection may occur if a session is disconnected. For example, a reconnection may have an abbreviated authentication mechanism or may direct some additional handshaking to occur.

The idle time policy 252 may define how an extended idle time may be handled. For example, a session may be idle for a period of time then may change states to paused, or may be disconnected or terminated at various periods of extended idle time.

Metapolicies 208 may define behaviors of clients or servers that relate to two or more sessions or the interrelationship between sessions. In many instances, a metapolicy may be defined for one type of session that may be different from a metapolicy for a different type of session.

For example, a metapolicy 208 may include a maximum number of sessions 254. The maximum sessions may define how many sessions a server or client may maintain simultaneously. In many cases, a license agreement or other factor may define or influence this variable. A maximum number of sessions 254 may define, for example, that a server may permit 20 total sessions.

In some cases, a metapolicy 208 may include a maximum number of permitted sessions per session type 256. Such a definition may permit, for example, a limited number of one type of session but a much larger type of another session. In many network servers, one local terminal session as well as one remote terminal session may be permitted, but many more sessions may be supported for other types of sessions.

A metapolicy 208 may include definitions for prohibited applications 258 and permitted applications 260. Session types may be defined for each permitted application or a general session type may be used when the permitted applications initiate a session. In some cases, prohibited devices 262 and permitted devices 264 may be defined as well. Such a definition may refer to specific devices with specific identifiers such as an Internet Protocol (IP) address or MAC address. In some cases, such a definition may refer to specific classes or types of devices, such as laptop computers, personal digital assistants, or other type of device.

Figure 3:
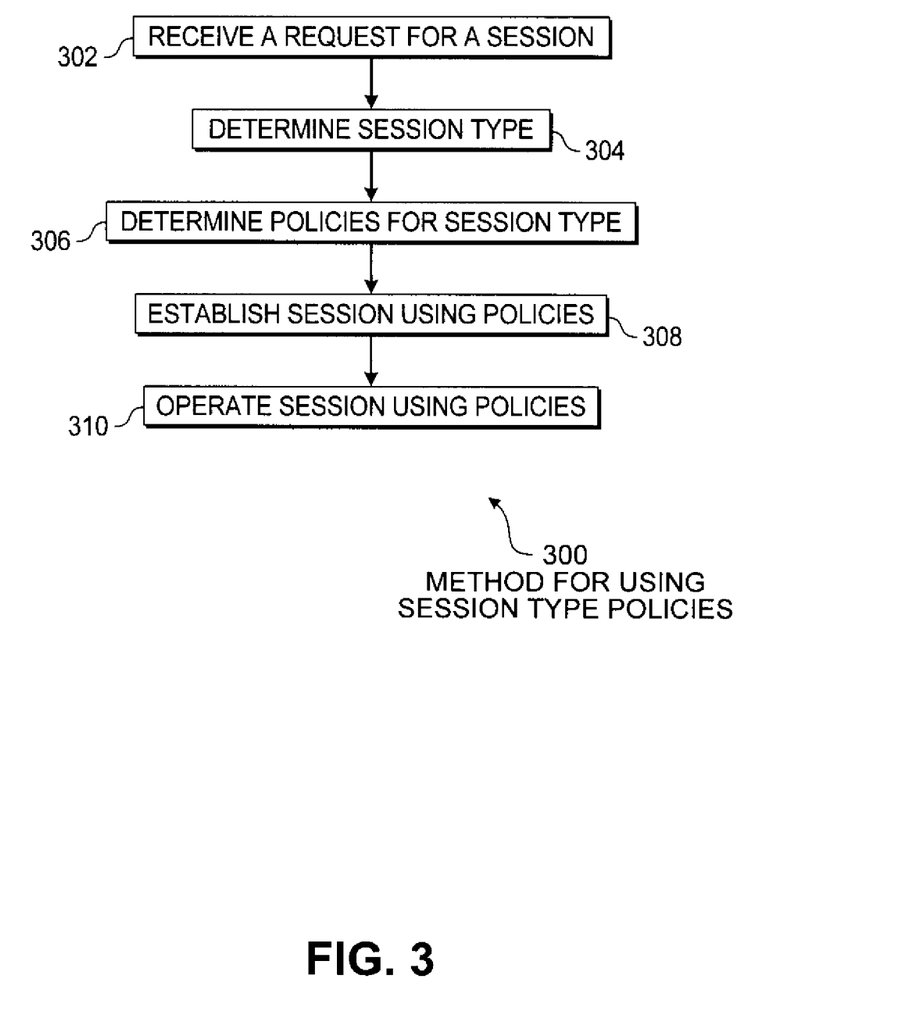
FIG. 3 is a flowchart illustration of an embodiment showing a method for using session type policies.

FIG. 3 is a flowchart illustration of an embodiment 300 showing a method for using session type policies. Embodiment 300 is a simplified example of a sequence that may be used by either a client device or server device for establishing and operating a session using policies defined for a specific type of session.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In embodiment 300, a request for a session may be received in block 302. In a client situation, a request may be received by a routine or function within the client device. The request may be generated by a user, an application, a service, or a device attached to the client. For example, a user may launch an application that is part of a client server application. The application may generate a request to establish a session which may be received by a function within the client. The function may perform the tasks illustrated in embodiment 300.

When embodiment 300 is performed by a server, a request may be transmitted from a client to the server and received in block 302.

A session type may be determined in block 304. Each embodiment may define a session type with varying degrees of specificity. In some embodiments, a set of policies may be defined for two or three different session types that may be defined with broad generalities. In other embodiments, tens or hundreds of session types may be defined, each with a separate set of policies.

Based on the session type in block 304, the specific policies may be determined for the session type in block 306.

The session may be established using the session type policies in block 308 and may be operated using the session type policies in block 310.

In many cases, a portion of the policies may relate to variables or parameters that are used when the policy is established. Many such parameters are fixed at the time the session is created and do not change during the course of the session. Examples of such parameters may be the configuration policies 204 in embodiment 200. In other cases, portions of the policies may define how a session behaves during the life of the session. Examples of such elements of a policy may be the operational policy 206 and metapolicy 208 in embodiment 200.

When a policy is used by a client device, the policy may include parameters that are transmitted to a server, and those parameters may be used by the server in establishing the session. In some cases, the policy parameters may include variables that enable the client to properly send the request to the server. The client policies may further define how a client may respond during the initial setup and handshaking used to initiate a session, and may also define how the session may be terminated or restarted once in use.

When a policy is used by a server device, the policy may include parameters used to establish a session and initiate communications with the client. The policies may define a session in a manner expected by the client and configured for the specific session type. During operation of the session, the session may behave according to the policies defined for the session type.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computing device, the method comprising:
   receiving, from another computing device, a request to establish a session;
   determining, based on the received request from the other computing device, a session type that is to correspond to the requested session;
   determining, prior to establishing the requested session, a set of policies that are to be applicable to the requested session based on the determined session type, wherein the set of policies includes at least one security parameter that is to be applicable to the requested session based on the determined session type;
   establishing the requested session; and
   operating the established session according to the determined set of policies that were to be applicable to the requested session.

2. The method of claim 1, wherein the method is performed by a client device, and wherein the establishing is initiated by the client device.

3. The method of claim 1, wherein the method is performed by a server device, and wherein the establishing is initiated by a client device.

4. The method of claim 1, wherein the session type is determined from amongst a group of session types, the group of session types including:
   a local user session;
   a remote user session;
   a connection by a device;
   a connection by a device type;
   a connection by a service; and
   a connection by a specific service.

5. The method of claim 1, wherein the set of policies define a set of operational characteristics for the determined session type.

6. The method of claim 1, wherein the set of policies define a set of configuration characteristics for the determined session type.

7. The method of claim 6, wherein the determining of the set of policies is based at least in part on a type of a source of the request to establish the session.

8. The method of claim 6, wherein the request to establish the session includes parameters, incorporated in the request, that are defined by the set of policies.

9. The method of claim 1, wherein the set of policies comprises a metapolicy that defines effects and behaviors for multiple sessions.

10. The method of claim 1, wherein the determining of the set of policies comprises:
    establishing a connection to policy server; and
    receiving at least a portion of the set of policies from the policy server.

11. The method of claim 10, wherein the determining of the set of policies further comprises:
    transmitting a request for the set of policies to the policy server.

12. A computing device, comprising:
    a network interface configured to interface the computing device to at least one other computing device;
    a memory storing a set of policies comprising at least one operational parameter definition for each of multiple session types; and
    an instruction execution system configured to:
       determine a first session type for a first interactive object;
       determine a first policy from the set of policies that is to be applied to the first session type prior to creating a first session, wherein the set of policies includes at least one security parameter that is to be applicable to the first session type;
       create and operates the first session with the first interactive object in accordance with the first policy;
       determine a second session type for a second interactive object;
       determine a second policy from the set of policies that is to be applied to the second session type; and
       create and operate a second session with the second interactive object in accordance with the second policy.

13. The computing device of claim 12, wherein the set of policies was distributed by a policy server.

14. The computing device of claim 12, wherein the first interactive object comprises at least one of:
    a local user;
    a remote user;
    a client device;
    a server device;
    a locally connected device;
    a remotely connected device;
    a plug and play device; or
    a remotely operating service.

15. The computing device of claim 12, wherein the set of policies comprises an instruction to redirect a driver.

16. The computing device of claim 12, wherein the set of policies comprises a definition of authentication to be used to establish sessions of the first session type.

17. The computing device of claim 12, wherein the determining of the first policy is based at least in part on a type of a source of a request to establish the first session.

18. The computing device of claim 12, wherein the instruction execution system is further configured to:
    receive a request to establish the first session, wherein the request includes parameters, incorporated in the request, that are defined by the set of policies.

19. A computer readable storage medium comprising at least one of a memory, disk, or disc, having computer-executable instructions stored therein, wherein the computer-executable instructions, in response to execution by a computing device, cause the computing device to execute a method, the method comprising:
    receiving a request from a client device to establish a session;
    determining, based on the received request from the client device, a session type that is to correspond to the requested session;
    determining a set of policies based on the determined session type, prior to establishing said session, wherein the set of policies comprises policies for both the client device and a server device, wherein the set of policies define a set of operational characteristics for the determined session type, a set of configuration characteristics for the determined session type, or both, and wherein the set of policies includes at least one security parameter that is to be applicable to the requested session;
    establishing the requested session using at least one session connection parameters defined in the set of policies for the determined session type; and operating the session according to at least one session operational parameter defined in the set of policies for the determined session type.

20. The computer readable storage medium of claim 19, wherein the determining of the set of policies is based at least in part on a type of a source of the request to establish the session.

21. A computing device, comprising:
a memory and an instruction execution system, wherein the memory and the instruction execution system are respectively configured to store and execute instructions that cause the computing device to perform operations, the operations comprising:
 receiving, from another computing device, a request to establish a session;
 determining a session type for the requested session;
 determining, prior to establishing the requested session, a set of policies that are to be applicable to the requested session based on the determined session type, wherein the set of policies includes at least one security parameter that is to be applicable to the requested session;
 establishing the requested session; and
 operating the established session according to the determined set of policies.

22. The computing device of claim 21, wherein the determining of the set of policies is based at least in part on a type of a source of the request to establish the session.

23. The computing device of claim 21, wherein the request to establish the session includes parameters, incorporated in the request, that are defined by the set of policies.

24. The computer readable storage medium of claim 19, wherein the request to establish the session includes parameters, incorporated in the request, that are defined by the set of policies.

* * * * *